UNITED STATES PATENT OFFICE.

SIGMUND FRÄNKEL, OF VIENNA, AUSTRIA-HUNGARY, ASSIGNOR TO CHEMISCHE FABRIK VON HEYDEN GESELLSCHAFT MIT BESCHRANKTER HAFTUNG, OF RADEBEUL, GERMANY.

EXTRACT OF SUPRARENAL GLAND.

SPECIFICATION forming part of Letters Patent No. 576,781, dated February 9, 1897.

Application filed April 16, 1896. Serial No. 587,843. (No specimens.)

*To all whom it may concern:*

Be it known that I, SIGMUND FRÄNKEL, of Vienna, in the Empire of Austria-Hungary, have invented a new and useful Pharmaceutical Product and a Process for Producing the Same, of which the following is a specification.

This invention consists in a new pharmaceutical product for the purpose of increasing the blood-pressure, the said product being the active principle of the suprarenal gland or capsule.

The said invention consists also in the process hereinafter described for obtaining the said product.

The new product is essentially different from the hitherto known ordinary extract of the suprarenal gland, as that extract contains the active principle in a greatly-diluted state only and polluted with an exceeding quantity of non-active or noxious substances.

According to my invention the suprarenal gland having been first freed from fat is comminuted, care being taken to avoid loss of the juice, and an extract is obtained therefrom by means of alcohol. The extract thus obtained is then purified and this is effected in the following way: The extract is first concentrated and the residue is boiled with water. The precipitate thus produced is filtered off after it has become cold. The filtrate is again strongly concentrated and the residue is boiled with alcohol, dark-colored impurities being also left behind in this case. The liquid when quite cold is mixed with about an equal volume or with double the volume of acetone, further bodies of a greasy or glutinous nature being precipitated by this means. The clear solution is then concentrated. If the strong concentrated solution of the active principle thus obtained is not capable of forming a clear solution in water and alcohol-acetone, then the aforesaid dissolving and precipitating operations by means of alcohol and acetone must be repeated.

Acetone may be employed as the equivalent of alcohol for first obtaining the extract from the gland or capsule.

The active principle thus obtained has the form of a yellow-brown syrup which is readily soluble in water, alcohol, and acetone. An ammoniacal solution of silver is reduced by it. Aqueous solutions of the principle, even when extremely diluted, assume temporarily an intensely-green color on addition of a drop of a solution of chlorid of iron.

This product is intended for use in pharmacy. Its special property or characteristic is that it increases the blood-pressure to an extraordinary degree.

The dose is from 0.01 gram to ten grams.

What I claim as my invention is—

1. The process for the production of the active principle of the suprarenal gland or capsule, which process consists in first obtaining an extract from the suprarenal gland or capsule by means of alcohol, second concentrating the said extract, third boiling the concentrated residue with water, fourth filtering off the precipitate of the said boiling, fifth evaporating the filtrate, sixth boiling the concentrated filtrate with alcohol, seventh adding acetone to the solution obtained by the latter boiling for the purpose of precipitating the remaining impurities therefrom, eighth concentrating the clear solution, substantially as herein set forth.

2. The new pharmaceutical product obtained as herein described for increasing the blood-pressure, being the active principle of the suprarenal gland or capsule, having the form of a yellow-brown syrup, an aqueous solution of which even when very diluted will be intensely colored green by chlorid of iron.

In testimony that I claim the foregoing as my invention I have signed my name in presence of two subscribing witnesses.

SIGMUND FRANKEL.

Witnesses:
HARRY BELMONT,
JOSEF ZENETUM.